United States Patent
Skipworth et al.

[11] Patent Number: 6,087,593
[45] Date of Patent: Jul. 11, 2000

[54] WIRE HARNESS PROTECTOR WITH ANTI-ROTATION AND SLIDING FEATURES

[75] Inventors: Richard Humes Skipworth, Plymouth; Raymond Paul Ernst, Jr., Canton; Steven Loyd Willis, Belleville, all of Mich.

[73] Assignee: Yazaki Corporation, Tokyo, Japan

[21] Appl. No.: 08/949,624

[22] Filed: Oct. 14, 1997

[51] Int. Cl.$^7$ .............................. H02G 3/00; H02G 3/26; H01R 13/56

[52] U.S. Cl. ................... 174/135; 174/72 A; 174/72 R; 174/72 C; 174/136; 439/447

[58] Field of Search ................ 174/135, 136, 174/72 A, 72 C, 72 R, 138 G, 79, 65 R, 92, 84 R; 439/447, 448, 449; 248/49, 73

[56] References Cited

U.S. PATENT DOCUMENTS

| | | | |
|---|---|---|---|
| 3,711,632 | 1/1973 | Ghirardi | 174/135 |
| 3,711,633 | 1/1973 | Ghirardi et al. | 174/135 |
| 4,790,581 | 12/1988 | Boswell et al. | 292/264 |
| 5,106,040 | 4/1992 | Cafmeyer et al. | 248/73 |
| 5,280,138 | 1/1994 | Preston et al. | 174/152 |
| 5,401,905 | 3/1995 | Lesser et al. | 174/99 |
| 5,556,059 | 9/1996 | Maeda et al. | 248/49 |
| 5,684,274 | 11/1997 | McLeod | 174/92 |

FOREIGN PATENT DOCUMENTS 62-15579  4/1987  Japan .

*Primary Examiner*—Dean A. Reichard
*Assistant Examiner*—Mark Olds
*Attorney, Agent, or Firm*—Young & Basile, P.C.

[57] ABSTRACT

A wire harness protector having an open slide trough closed by a removable cover, and containing an internal wire harness carrier attached to the harness, for example by taping, and connected to the cover to slide in the trough when the cover is closed. The carrier is generally L-shaped, and the trough has a wire slot formed in a sidewall thereof generally parallel to the guide slot in the cover, such that the wire harness is redirected laterally within the trough by the carrier, with an incoming end sliding longitudinally in the trough, and an outgoing end sliding laterally through the wire slot in the side wall. The wire harness protector according to the invention is especially useful for protecting and controlling wire harness slack found between hinged and sliding surfaces in a vehicle, for example doors, hoods and trunk lids.

10 Claims, 2 Drawing Sheets

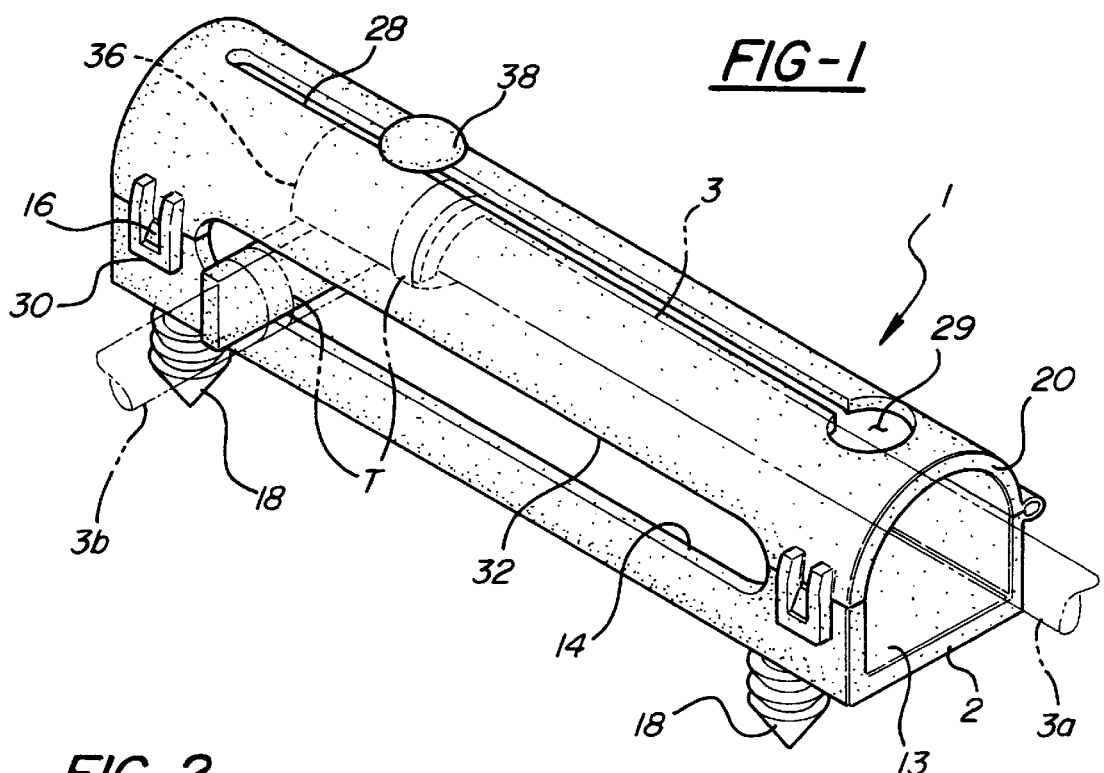
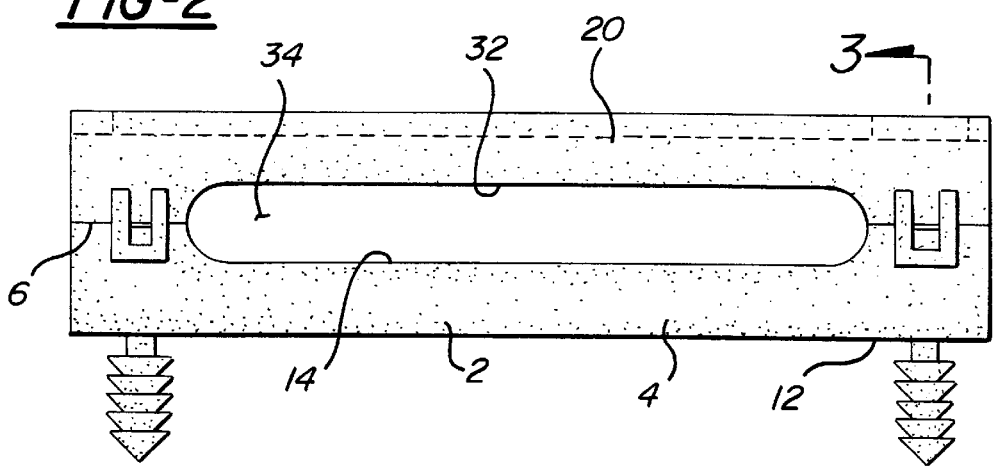
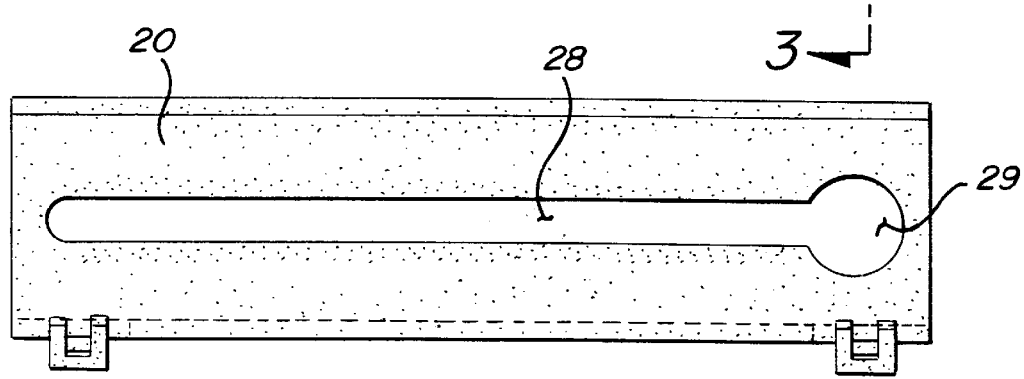

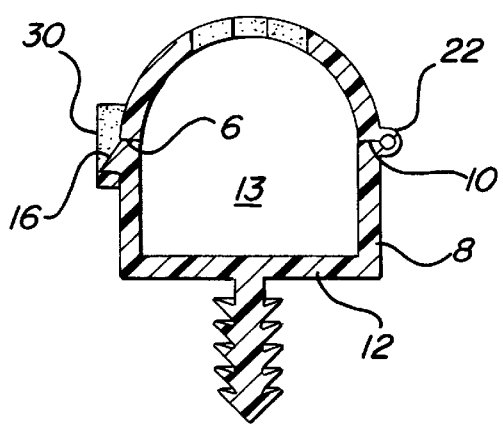
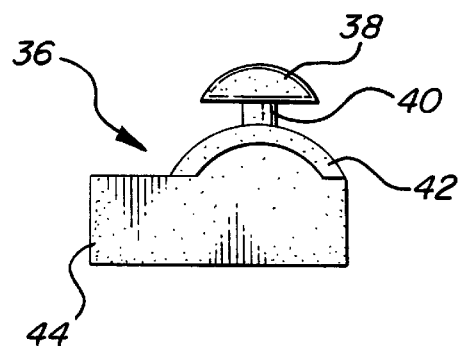
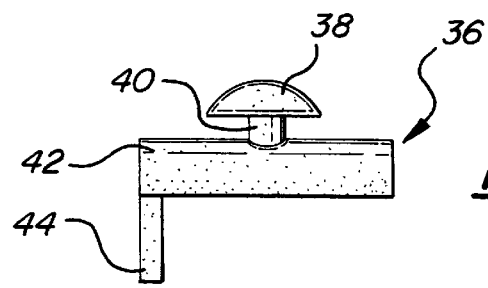
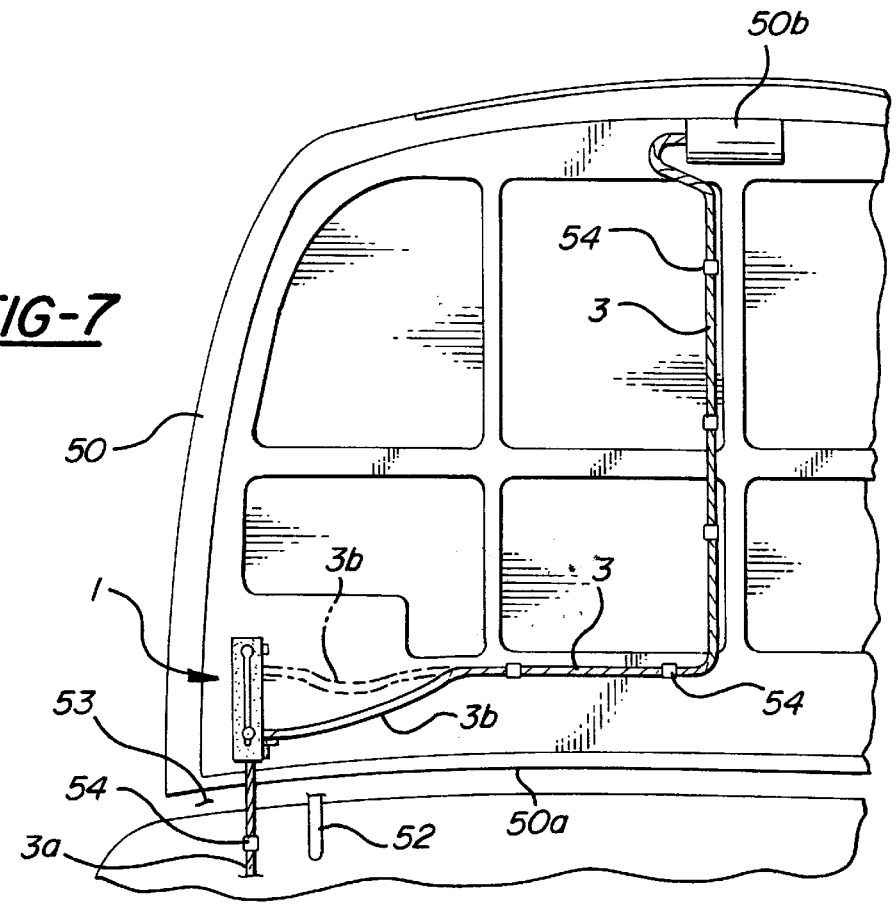

WIRE HARNESS PROTECTOR WITH ANTI-ROTATION AND SLIDING FEATURES

1. Field of the Invention

This invention relates in general to the field of wire harness protectors, and more particularly to protectors which allow a wire harness to move relative to the protector without damaging the wire harness.

2. Discussion of Related Art

Wire harnesses for electrical components in automotive vehicles are usually securely fastened to vehicle body panels along the route to the components. But in certain locations, such as on car doors and trunk lids, the wire harness requires some slack which moves relative to the door or trunk lid as it swings or slides open. This prevents damage to the wires from abrasion or stretching. Taking the example of trunk lids, wire harnesses from the vehicle electrical system have typically been routed from the vehicle body along the trunk hinges with a short amount of slack, en route to electrical components such as trunk-mounted brake lights and keyless trunk latches. The hinges provide rigid mounting points and protect the wire harnesses and serve to some extent as slack guides. In some new vehicles, however, the old style rigid hinges have been moved to different positions in the trunk or have been replaced with leaf spring type hinges which require more wire harness slack. Without the hinges as mounting points, and with more slack to contend with, some means for controlling and protecting the wire harness slack is needed.

Additionally, the wire harness slack across hinged or sliding vehicle surfaces often must be redirected at or near the point where it crosses the adjacent hinged surfaces. For example, in the trunk lid scenario, the wire harness may need to be routed first to the outside edges of the trunk lid for the transition across the gap from the trunk to the lid, then in toward the middle of the trunk lid, and finally out to the center of the rear edge of the trunk lid.

Prior wire harness protectors are known which include troughs for enclosing the harness. The trough can be anchored to prevent rotation, as disclosed for example by Japanese Utility Model Publication No. 62-15579 and U.S. Pat. No. 5,401,905. The Japanese document also discloses using a slide rail (10) between the wire harness protector and its mount (8,9,11) to panel (12), which allows sliding movement between the protector and mount when the wire harness is pushed or pulled.

U.S. Pat. No. 5,106,040 shows a wire harness mounted for sliding movement on a steering wheel column. The wire harness is taped to an open trough-type carrier. A slide pin on the carrier slides in a track in a bracket secured to the steering column. The carrier mounted wire harness slides and rotates on the bracket to respond to both axial and tilt adjustment of the steering wheel without damage to the wire harness.

None of the foregoing prior devices is designed to control and protect the type of wire harness slack created by the above-described trunk lid mounting scenario and other similar mounting environments in a vehicle.

SUMMARY OF THE INVENTION

In general the invention is a wire harness protector comprising a trough fixed to a movable surface such as a vehicle door, hood or trunk lid; a cover for closing the trough; and an internal wire harness carrier mounted to slide in the closed trough. The trough is open at one "inbound" end to receive the wire harness in longitudinal fashion. The wire harness cover has a longitudinal guide slot which carries the internal wire harness carrier in sliding fashion.

In a preferred embodiment, the trough sidewall has a wire slot which provides a lateral slide opening for an "outgoing" portion of the wire harness bent laterally relative to the inbound portion. In a most preferred form the wire slot in the trough sidewall is an open-sided half slot, the other half of the slot being formed in a mating edge of the cover such that closing the cover closes the slot and traps the sliding portion of the wire harness therein.

The wire harness is preferably secured to the internal carrier by simple means such as tape. In a preferred form the carrier includes two right-angled mounting surfaces for securing the wire harness to the carrier in an L-shaped configuration. The wire harness and carrier are placed in the trough with the cover open. The cover is closed and latched to the trough. The carrier and attached wire harness slide freely within the confines of the trough, guided by the carrier's connection to the guide slot in the cover and the angled portion of the wire harness extending through the wire slot in the sidewall.

These and other objects, features, aspects and advantages of the invention will be more clearly understood from the following description and the accompanying drawings.

BRIEF DESCRIPTION OF THE DRAWINGS

FIG. 1 is an end perspective view of a wire harness protector according to the present invention with a wire harness mounted therein;

FIG. 2 is a side view of the wire harness protector of FIG. 1;

FIG. 3 is an end view of the protector;

FIG. 4 is a top view of the protector illustrating a guide slot for a wire harness carrier;

FIG. 5 is an end view of a wire harness carrier for use with the protector of the present invention;

FIG. 6 is a side view of the wire harness carrier of FIG. 5;

FIG. 7 is a schematic illustration of an open car trunk viewed from the rear of the car, showing an example of a wire harness protector according to the present invention mounted on the trunk lid.

COMPLETE DESCRIPTION OF AN ILLUSTRATED EMBODIMENT

Referring first to FIG. 1, the wire harness protector of the present invention is generally denoted by reference numeral 1, illustrated in a closed position with a wire harness 3 routed through the protector for limited sliding movement. Protector 1 comprises a lower trough 2 with a hinged or otherwise removable but latchable upper cover 20 latched in a closed position by an ordinary latch and hook arrangement such as that illustrated at 16, 30. The protector is preferably molded from a plastic such as nylon.

Wire harness protector 1 is designed to be attached to a moveable portion of the vehicle, for example a hinged door, hood or trunk lid, via barbed arrowhead or "Christmas tree"-type fasteners 18 which can be inserted into mating holes in the mounting surface. In this present illustrated embodiment, wire harness protector 1 will be described and illustrated in use on the interior surface of a trunk lid, although it will be apparent to those skilled in the art that it can be used in other locations on the vehicle where it is desirable to control the motion of a semi-rigid wire harness or cable with respect to the joint between two moving (usually hinged) surfaces.

Referring now to FIGS. 2 through 4, wire harness protector 1 is illustrated in side, end and top views, without the wire harness for clarity of illustration. Lower trough portion 2 is an open-faced, generally U-shaped piece having a front sidewall 4 with an upper edge 6, a rear sidewall 8 with an upper edge 10, and bottom 12. Although illustrated as being rectangular in cross section (FIG. 3), trough 2 can take other shapes such as semi-circular. Trough 2 is open at one end, shown as open end 13 in FIGS. 2 and 3, and may optionally be open at the other end, if desired, although not necessary. Front sidewall 4 of trough 2 supports finger or tab portions 16 of the previously mentioned latching mechanism.

Front sidewall 4 of trough 2 includes a half-slot cutout 14 opening onto upper edge 6. Half-slot cutout 14 mates with a similar cutout 32 formed in the mating edge of cover 20 to form an elongated wire slot 34 having a width capable of receiving the wire harness therethrough and allowing the harness to slide freely from end to end of slot 34.

Although wire slot 34 is shown as being formed from two identical "half"-slots 14 and 32, and is shown with generally rounded end portions, the: need not literally comprise one-half of the overall slot 34. However, the identical half-slot arrangement located along the mid-line of the wire harness protector is preferred.

Referring to the open end view in FIG. 3, cover 20 preferably has a rounded cross section, and is hinged at 22 to the upper edge 10 of rear sidewall 8 on the trough. While the hinged design is preferred, it will be understood by those skilled in the art that cover 20 may be completely removable from trough 2, if desired, using other known mechanisms for removably securing it to trough 2. As illustrated, the hinged and front edges of rounded cover 20 preferably mate in a flush fit with edges 6 and 10 on trough 2, at least on the interior, to provide a smooth, snag-free sliding surface for the wire harness.

Referring to FIG. 4, an elongated guide slot 28 is formed along the top centerline of cover 20. Guide slot 28 includes a widened insert hole 29 at one end for receiving a portion of wire harness carrier 36 illustrated in FIGS. 5 and 6. Wire harness carrier 36 is a generally L-shaped molded plastic piece, having a large diameter carrier head 38 designed to fit through insert hole 29 in guide slot 28, and a smaller diameter carrier pin 40 designed to fit and slide within guide slot 28 while head 38 holds the carrier to cover 20. Carrier 36 primarily consists of a first longitudinal arm 42 for supporting an "incoming" portion of the wire harness, the longitudinal arm preferably having a curved cross section designed to match the interior curvature of cover 20 and the rounded surface of the wire harness or cable; and, a lateral arm 44 for supporting an "outgoing" portion of the wire harness, extending at preferably a right angle from the end of carrier 36 so that it projects laterally through wire slot 34 in the sidewall of the wire harness protector. As best illustrated by comparing FIGS. 3 and 5, arm 44 preferably extends laterally at least far enough to rest on the surfaces of wire slot 34, and may even extend slightly beyond.

Curved arm 42 and lateral arm 44 on carrier 36 are designed to provide mounting surfaces to which the wire harness can be secured, usually by the industry standard of taping the harness to the carrier with tape T . It will be apparent that to secure the wire harness to carrier 36, the wire harness must be bent at right angles, following the shape of the carrier, with an incoming "longitudinal" portion 3a of the harness taped to longitudinal arm 42, and an outgoing "lateral" portion 3b of the wire harness bent and taped to lateral arm 44.

As best shown in FIG. 1, carrier 36 shapes the wire harness into an "L" configuration prior to being placed in open trough 2, such that incoming end 3a of the wire harness enters the open end 13 of the trough, while outgoing end 3b of the wire harness exits the trough laterally through slot 34. Once the carrier-mounted wire harness is placed in trough 2, cover 20 is simply hinged closed such that the outgoing portion of the wire harness (and preferably a portion of lateral arm 44) is trapped in wire slot 34 in a sliding fit. The closed wire harness protector with its internal sliding carrier provides a fixed "track" of limited length on which the associated section of the wire harness can slide; protects the connection between the wire harness and the carrier; and re-shapes or redirects the sliding portion of the harness into an L configuration.

Referring now to FIG. 7, the utility of the above-described inventive wire harness protector is best shown in a schematic example illustrating the protector mounted on the forward (hinge) edge of an automobile trunk lid. Trunk lid 50 is hinged at 52 with hinge arrangements of a known type. Wire harness 3 is routed from the interior of the trunk across gap 53 to trunk lid 50, fastened in place with periodically spaced studs or clips 54. Once on trunk lid 50, however, it is necessary to provide a certain amount of unfastened slack in the wire harness in the region of gap 53 to accommodate the range of motion between the trunk-open and trunk-closed positions. It is also necessary to redirect the harness laterally toward the center of the trunk lid before routing it to any center-mounted components such as lock mechanism 50b, to keep the slack across gap 53 to a minimum. It is further necessary to control the slack portion of the wire harness to prevent its being pinched, hooked or otherwise snagged by the moving trunk surfaces or by luggage being put into or taken out of the trunk.

This is achieved using the wire harness protector of the present invention as follows: protector 1 is mounted at or near the point at which the wire harness is routed across the trunk gap, in longitudinal alignment with the axis of the car, its open end 13 facing the front of the car, i.e. toward forward edge 50a of trunk lid 50. Wire harness protector 1 is rotationally positioned such that wire slot 34 and lateral carrier arm 44 face the centerline of trunk lid 50 generally parallel to the plane of the trunk lid. As shown in broken lines, this mounting arrangement redirects and holds the unfastened "outgoing" portion 3b of the semi-rigid wire harness against the trunk lid yet allows this redirected portion to slide freely to accommodate the range of motion of the trunk lid. The sliding motion of the slack portion 3b of the wire harness will therefore generally be in the plane of the trunk lid, keeping it out of the trunk compartment both in the trunk-open and trunkclosed positions. The broken lines illustrate the position of slack portion 3b relative to the trunk lid when the trunk is closed, while the solid lines illustrate the slack portion 3b relative to the trunk lid in the trunk open position.

It will be seen that, as the trunk lid is opened, carrier 36 moves from one end of the wire harness protector toward the opposite end, keeping the slack portion of the wire harness held securely against the trunk lid to prevent its being snagged as the trunk is loaded or unloaded. When the trunk lid is closed, carrier 36 moves back toward the other end of the trough, limited by slot 34, until the wire harness is in the position shown in broken lines.

Normally, an unsupported length of wire harness slack resting against the trunk lid will tend to drop into the trunk compartment or interfere with the hinges when the trunk is closed. The long, enclosed trough of the present invention and the L-shaped reconfiguration of the wire harness in the trough serve to provide some additional support and rigidity to the slack portion of the wire harness when the trunk is closed, reducing or eliminating the harness tendency to fall away from the trunk lid. For very heavy or very limp wire harnesses, it may be desirable in some situations to provide an optional stiffening rod, for example a polypropylene stiffening rod on the slack portion of the wire bundle to help keep it against the trunk lid in the trunk closed position.

The foregoing description of an illustrated embodiment of the invention is an exemplary and preferred embodiment. It should not, however, be construed as limiting the invention beyond the scope of the following claims, since reasonable modifications for specific applications will be apparent to those skilled in the art now that we have disclosed a specific example of our invention.

We accordingly claim:

1. A wire harness protector comprising:

a trough having an open end for receiving a wire harness, the trough capable of being secured to a mounting surface;

a cover capable of being mated to the trough to close the trough;

a carrier capable of being attached to the wire harness, the wire harness and the attached carrier being positioned to slide within the trough when the trough is closed, wherein the wire harness carrier has a longitudinal mounting portion capable of being attached to an incoming portion of the wire harness entering the open end of the trough and a lateral mounting portion projecting laterally at an angle from the longitudinal mounting portion and capable of being attached to an outgoing portion of wire harness, such that the lateral mounting portion laterally redirects the outgoing portion of the wire harness in the trough at a lateral angle with respect to the incoming portion, the trough further including a wire slot in a side surface thereof such that the incoming portion if the wire harness enters the trough at the open end, and the outgoing portion of the wire harness exits the trough through the wire slot at the lateral angle with respect to the incoming portion.

2. A wire harness protector as defined in claim 1, wherein the wire slot comprises a half-slot in a wall of the trough and a mating half-slot in a wall of the cover, the half-slots mating to form the wire slot when the cover is closed on the trough.

3. A wire harness protector as defined in claim 1, wherein the cover has a curved interior surface, and the longitudinal mounting portion of the carrier is contoured to conform to the curved interior surface of the cover.

4. A wire harness protector as defined in claim 1, wherein the carrier is L-shaped and the lateral mounting portion extends at a right angle from the longitudinal mounting portion.

5. A wire harness protector as defined in claim 1, wherein the trough includes at least one fastener on a bottom exterior surface thereof opposite the cover for securing the trough to the mounting surface.

6. A wire harness protector capable of being mounted on a moving surface to both control and redirect a sliding portion of a wire harness inserted in the protector, comprising:

an open-faced, generally tubular trough having an open end for longitudinally receiving a wire harness, the trough further capable of being secured to a mounting surface;

a cover capable of being mated to the trough to close the trough;

a carrier capable of being attached to the wire harness, the carrier having a longitudinal mounting portion in the path of the incoming portion of the wire harness for redirecting an outgoing portion of the wire harness laterally relative to the incoming portion;

means on the carrier and the cover for slidably securing the carrier to the cover, whereby the wire harness and the attached carrier are designed to slide longitudinally within the trough when the trough is closed;

a wire slot formed in a side wall of the trough through which the laterally redirected outgoing portion of the wire harness exits the trough, the wire slot running longitudinally along the trough to permit the wire harness to slide freely therein.

7. A wire harness protector as defined in claim 6, wherein the wire slot comprises a half slot in a side wall of the trough and a mating half slot in a wall of the cover, the half slots mating to form the wire slot when the cover is closed on the trough.

8. A wire harness protector as defined in claim 6, wherein the wire slot has a width capable of receiving an end of the lateral mounting portion of the carrier therethrough such that the carrier rides on the slot.

9. A wire harness protector capable of being mounted on a moving surface to both control and redirect a sliding portion of a wire harness inserted in the protector, comprising:

an open-faced generally tubular trough having an open end for longitudinally receiving a wire harness, the trough further capable of being secured to a mounting surface;

a cover capable of being mated to the trough to lose the trough;

a carrier capable of being attached to the wire harness, the carrier designed to fit with the attached wire harness inside the closed trough to slide therein, the carrier having means for redirecting the wire harness laterally within the trough such that an outgoing portion of the wire harness extends laterally through a wire slot in a side wall of the trough, the wire slot being sized stitch that the laterally redirected potion of the wire harness slides freely in the wire slot.

10. A wire harness protector as defined in claim 9, wherein the redirecting means comprises a longitudinal mounting portion for attachment to a portion of the wire harness entering the open end of the trough and a lateral mounting portion extending laterally from the longitudinal mounting portion for attachment to the laterally redirected portion of the wire harness extending through the wire slot in the trough side wall, whereby the carrier is L-shaped.

* * * * *

UNITED STATES PATENT AND TRADEMARK OFFICE
CERTIFICATE OF CORRECTION

PATENT NO. : 6,087,593
DATED : July 11, 2000
INVENTOR(S) : Skipworth, et al

Page 1 of 1

It is certified that error appears in the above-identified patent and that said Letters Patent is hereby corrected as shown below:

Column 3,
Line 19, delete "the:" and insert -- they --

Column 4,
Line 49, delete "trunkclosed" and insert -- trunk-closed --

Column 5,
Line 37, delete, "if" and insert -- of --

Column 6,
Line 8, after "longitudinal mounting portion" insert -- for receiving an incoming portion of the wire harness, the carrier further having a lateral mounting portion extending laterally from the longitudinal mounting portion in the path of the incoming portion of the wire harness --

Column 6,
Line 39, delete "lose" and insert -- close --
Line 48, delete "stitch" and insert -- such --
Line 49, delete "potion" and insert -- portion --

Signed and Sealed this

Seventh Day of August, 2001

*Attest:*

*Attesting Officer*

NICHOLAS P. GODICI
*Acting Director of the United States Patent and Trademark Office*